United States Patent
Du et al.

(10) Patent No.: US 9,323,001 B2
(45) Date of Patent: Apr. 26, 2016

(54) POLARIZATION-DEPENDENT LOSS COMPENSATOR

(71) Applicant: FINISAR CORPORATION, Sunnyvale, CA (US)

(72) Inventors: Juyou Du, Shanghai (CN); Haifeng Ji, Jiaxing (CN); Fan Chen, Shanghai (CN); Weilong Cui, Shanghai (CN); Li Zhang, Shanghai (CN)

(73) Assignee: FINISAR CORPORATION, Sunnyvale, CA (US)

( * ) Notice: Subject to any disclaimer, the term of this patent is extended or adjusted under 35 U.S.C. 154(b) by 149 days.

(21) Appl. No.: 14/206,941

(22) Filed: Mar. 12, 2014

(65) Prior Publication Data
US 2015/0205048 A1   Jul. 23, 2015

(30) Foreign Application Priority Data
Jan. 22, 2014   (CN) .......................... 2014 1 0031005

(51) Int. Cl.
*G02B 6/27* (2006.01)
*G02B 1/11* (2015.01)
*G02B 1/116* (2015.01)

(52) U.S. Cl.
CPC ............... *G02B 6/2793* (2013.01); *G02B 1/11* (2013.01); *G02B 1/116* (2013.01)

(58) Field of Classification Search
CPC ...................................... G02B 6/2793
See application file for complete search history.

(56) References Cited

U.S. PATENT DOCUMENTS

| | | | |
|---|---|---|---|
| 6,347,164 B1 * | 2/2002 | Rudkevich | G02B 6/266 |
| | | | 359/489.14 |
| 2002/0196539 A1 * | 12/2002 | Maestle | G02B 6/266 |
| | | | 359/489.05 |
| 2013/0119243 A1 * | 5/2013 | Yuan | G01J 1/04 |
| | | | 250/227.26 |

* cited by examiner

*Primary Examiner* — Jerry Rahll
(74) *Attorney, Agent, or Firm* — Maschoff Brennan

(57) ABSTRACT

In an embodiment, a polarization-dependent loss (PDL) compensator includes a substrate, an anti-reflective coating, and a partial reflective coating. The substrate has an input surface and an output surface opposite the input surface. The anti-reflective coating is formed on the output surface. The partial reflective coating is formed on the input surface. The PDL compensator may include PDL that depends on an incident angle of an optical signal with respect to the partial reflective coating.

20 Claims, 10 Drawing Sheets

POLARIZATION-DEPENDENT LOSS COMPENSATOR

CROSS-REFERENCE TO RELATED APPLICATIONS

This patent application claims priority to Chinese Patent Application No. 201410031005.0, filed Jan. 22, 2014, which is incorporated herein by reference.

FIELD

Embodiments described herein generally relate to a polarization-dependent loss (PDL) compensator.

BACKGROUND

Unless otherwise indicated herein, the materials described herein are not prior art to the claims in the present application and are not admitted to be prior art by inclusion in this section.

In some optical systems, optical signals traversing the optical systems may experience optical phenomena that degrade the quality of the signal detected. One such phenomenon is PDL. PDL is differential signal attenuation experienced between different polarization states of an optical signal due to the non-isotropic nature of some optical media.

An optical channel monitor (OCM) is an example of an optical system that may impart PDL to optical signals that traverse the OCM. The PDL of some OCM designs may result in very low yield, e.g., less than 50% yield, unless the PDL is compensated in the OCM.

The subject matter claimed herein is not limited to embodiments that solve any disadvantages or that operate only in environments such as those described above. Rather, this background is only provided to illustrate one exemplary technology area where some embodiments described herein may be practiced.

SUMMARY

Technologies described herein generally relate to a polarization-dependent loss compensator.

In an example embodiment, a polarization-dependent loss compensator includes a substrate, an anti-reflective coating, and a partial reflective coating. The substrate has an input surface and an output surface opposite the input surface. The anti-reflective coating is formed on the output surface. The partial reflective coating is formed on the input surface.

According to a preferred embodiment, the polarization dependent loss compensator includes a polarization-dependent loss that depends on an incident angle of an optical signal with respect to the partial reflective coating.

According to a preferred embodiment, the partial reflective coating comprises material layers of alternating index of refraction.

According to a preferred embodiment, the material layers of alternating index of refraction comprise at least one layer of tantalum oxide (Ta2O5) and at least one layer of silicon dioxide.

According to a preferred embodiment, the at least one layer of tantalum oxide comprises one layer of tantalum oxide having a quarter wave optical thickness of 0.1523 nanometers and a thickness of 28.24 nanometers, and the at least one layer of silicon dioxide comprises one layer of silicon dioxide having a quarter wave optical thickness of 0.6920 nanometers and a thickness of 183.66 nanometers.

According to a preferred embodiment, the polarization-dependent loss of the polarization-dependent loss compensator is wavelength-dependent.

According to a preferred embodiment, the partial reflective coating may comprise: a first layer of tantalum oxide having a quarter wave optical thickness of 1.3450 nanometers and a thickness of 249.37 nanometers; a second layer of silicon dioxide having a quarter wave optical thickness of 1.5269 nanometers and a thickness of 405.26 nanometers; a third layer of tantalum oxide having a quarter wave optical thickness of 1.4674 nanometers and a thickness of 272.07 nanometers; a fourth layer of silicon dioxide having a quarter wave optical thickness of 1.5272 nanometers and a thickness of 405.34 nanometers; a fifth layer of tantalum oxide having a quarter wave optical thickness of 1.3236 nanometers and a thickness of 245.40 nanometers; and a sixth layer of silicon dioxide having a quarter wave optical thickness of 1.2590 nanometers and a thickness of 334.15 nanometers.

According to a preferred embodiment, the partial reflective coating may further comprise: a first layer of tantalum oxide having a quarter wave optical thickness of 1.0269 nanometers and a thickness of 190.39 nanometers; a second layer of silicon dioxide having a quarter wave optical thickness of 0.9348 nanometers and a thickness of 248.11 nanometers; a third layer of tantalum oxide having a quarter wave optical thickness of 0.5283 nanometers and a thickness of 97.95 nanometers; a fourth layer of silicon dioxide having a quarter wave optical thickness of 0.5837 nanometers and a thickness of 154.92 nanometers; a fifth layer of tantalum oxide having a quarter wave optical thickness of 0.9006 nanometers and a thickness of 166.98 nanometers; and a sixth layer of silicon dioxide having a quarter wave optical thickness of 0.3284 nanometers and a thickness of 87.16 nanometers.

According to a preferred embodiment, the anti-reflective coating comprises: a first layer of tantalum oxide having a quarter wave optical thickness of 0.3208 nanometers and a thickness of 59.48 nanometers; a second layer of silicon dioxide having a quarter wave optical thickness of 0.3507 nanometers and a thickness of 93.08 nanometers; a third layer of tantalum oxide having a quarter wave optical thickness of 1.1100 nanometers and a thickness of 205.80 nanometers; and a fourth layer of silicon dioxide having a QWOT of 1.1049 nanometers and a thickness of 269.37 nanometers.

According to a preferred embodiment, the substrate comprises fused silica.

In another example embodiment, a method to compensate polarization-dependent loss includes receiving, at a polarization-dependent loss compensator, an input signal subject to polarization-dependent loss within a propagation channel in which a first of two polarization states of the input signal is attenuated more than a second of the two polarization states. The method also includes rotating the polarization-dependent loss compensator such that an incident angle of the input signal with respect to an input surface of the polarization-dependent loss compensator is effective to compensate the polarization-dependent loss of the input signal within the propagation channel. The method also includes compensating the polarization-dependent loss of the input signal.

According to a preferred embodiment, compensating the polarization-dependent loss of the input signal comprises attenuating the second of the two polarization states of the input signal more than the first of the two polarization states.

According to a preferred embodiment, attenuating the second of the two polarization states of the input signal more than the first of the two polarization states comprises attenuating, by the polarization-dependent loss compensator, the second of the two polarization states of the input signal by an amount equal to an attenuation of the first of the two polarization states by the propagation channel less an attenuation of the first of the two polarization states by the polarization-dependent loss compensator.

According to a preferred embodiment, rotating the polarization-dependent loss compensator comprises at least one of rotating the polarization-dependent loss compensator about a first axis of rotation that is orthogonal to a propagation direction of the input signal or rotating the polarization-dependent loss compensator about a second axis of rotation that is orthogonal to the propagation direction of the input signal and to the first axis of rotation.

According to a preferred embodiment, compensating the polarization-dependent loss of the input signal comprises transmitting the input signal through a partial reflective coating that includes material layers of alternating index of refraction, a substrate, and an anti-reflective coating that includes material layers of alternating index of refraction.

In yet another example embodiment, an optical channel monitor includes a propagation channel and a polarization-dependent loss compensator. The propagation channel includes multiple optical elements and a polarization-dependent loss. The polarization-dependent loss compensator is disposed in the propagation channel and is configured to at least partially compensate the polarization-dependent loss of the propagation channel. The polarization-dependent loss compensator includes a substrate having an input surface and an output surface opposite the input surface. The polarization-dependent loss compensator also includes an anti-reflective coating formed on the output surface of the substrate. The polarization-dependent loss compensator also includes a partial reflective coating formed on the input surface.

According to a preferred embodiment, the plurality of optical elements include: a mirror positioned to receive and reflect an optical signal from an input of the optical channel monitor; an imaging lens positioned to receive the optical signal after reflection by the mirror; an expanding prism positioned to receive the optical signal after transmission through the imaging lens; a downwardly directed mirror positioned to receive the optical signal after transmission through the expanding prism and to reflect the optical signal a first time; a microelectromechanical systems mirror positioned to receive the optical signal after reflection by the downwardly directed mirror the first time and to reflect the optical signal back to the downwardly directed mirror for reflection of the optical signal a second time; and a grism positioned to receive the optical signal after reflection by the downwardly directed mirror the second time.

According to a preferred embodiment, the polarization-dependent loss compensator is disposed between the input of the optical channel monitor and the imaging lens.

According to a preferred embodiment, the optical channel monitor further comprises: a substrate on which the mirror, the imaging lens, the expanding prism, the downwardly directed mirror, the MEMS mirror, and the grism are mounted; and a rotation assembly that couples the PDL compensator to the substrate, wherein the rotation assembly is configured to rotate the PDL compensator about one or more axes of rotation.

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DESCRIPTION OF EMBODIMENTS

Embodiments described herein generally relate to a PDL compensator. Generally, PDL may include differential signal attenuation experienced between different polarization states due to the non-isotropic nature of various optical media. PDL may be wavelength-dependent and may be prominent at high data rate transmission. Compensating for PDL may be useful in an optical channel monitor (OCM) as it may allow the constraints of certain optical elements with the OCM to be relaxed.

In general terms, PDL may include a difference between transmittance of two orthogonal polarization components of an optical signal in a medium. In some embodiments, PDL of a medium (e.g., a waveguide) may be defined specifically according to equation 1:

$$PDL = \Gamma_{TE} - \Gamma_{TM} \qquad \text{(eq. 1)}$$

In equation 1, PDL is polarization-dependent loss, $\Gamma_{TE}$ is transmittance of transverse-electric (TE)-polarized light in a medium, and $\Gamma_{TM}$ is transmittance of transverse-magnetic (TM)-polarized light in the medium. In some cases, TE-polarized light and TM-polarized light may be respectively equivalent to s-polarized light and p-polarized light.

At least some embodiments of a PDL compensator described herein may include a substrate with a PR coating formed on an input surface of the substrate and an AR coating formed on an output surface of the substrate. Each of the PR and AR coatings may include material layers of alternating index of refraction. In an example embodiment, for instance, each of the PR coating and the AR coating may include at least one layer (and possibly multiple layers) of tantalum oxide (Ta2O5) arranged in an alternating manner with at least one layer (and possibly multiple layers) of silicon dioxide (SiO2).

Embodiments of the PDL compensator may be used to compensate PDL in an optical channel monitor (OCM) or other systems or devices suffering from PDL. Alternately or additionally, embodiments of the PDL compensator may be used as a PDL generator to generate a continuous PDL output within a wavelength range of the PDL compensator.

Reference will now be made to the figures wherein like structures will be provided with like reference designations. The drawings are diagrammatic and schematic representations of exemplary embodiments and, accordingly, are not limiting of the scope of the claimed subject matter, nor are the drawings necessarily drawn to scale.

Figure 1A:
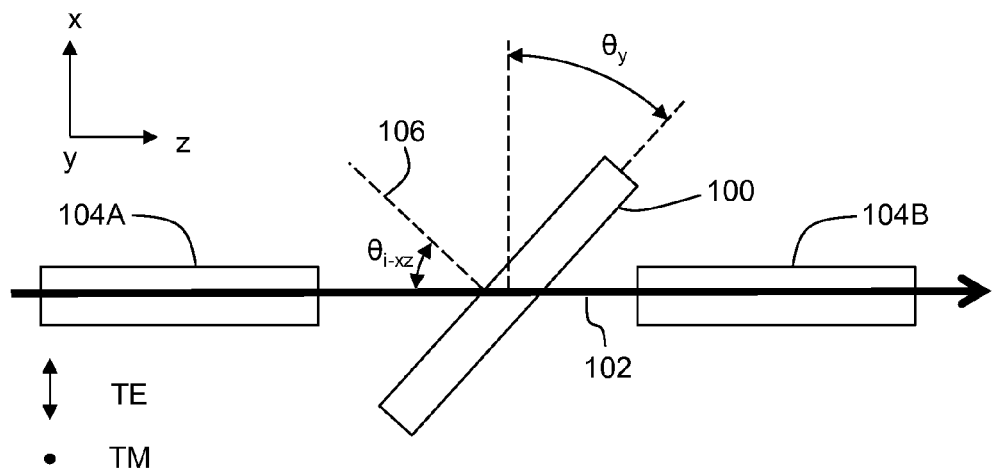
FIGS. 1A and 1B illustrate an example PDL compensator.
Figure 1B:
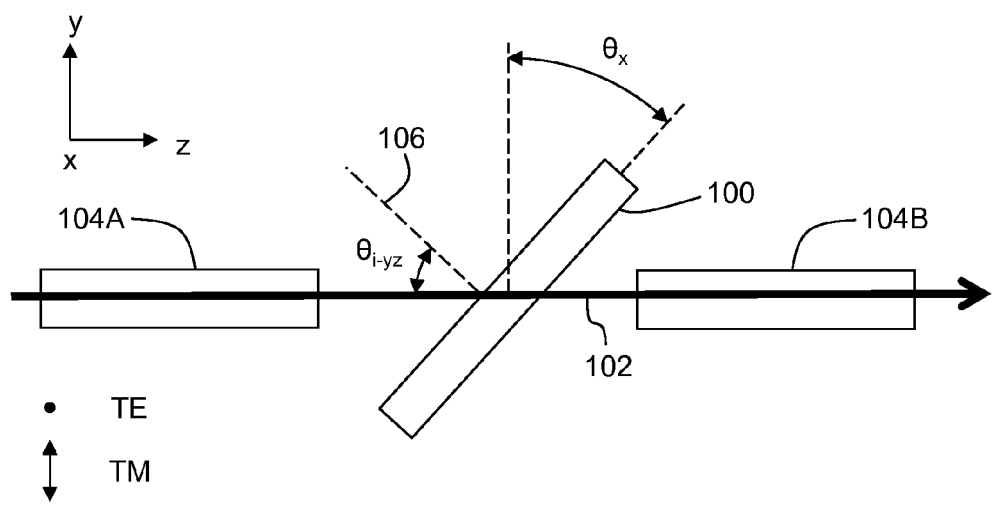

FIGS. 1A and 1B illustrate an example PDL compensator 100, arranged in accordance with at least one embodiment described herein. FIGS. 1A and 1B additionally illustrate an arbitrarily-defined xyz reference frame including orthogonal coordinate axes x, y, and z. An optical signal 102 may propagate through the PDL compensator 100 in a direction that is parallel or substantially parallel to the z axis. In the illustrated embodiment of FIGS. 1A and 1B, TE-polarized light may have a polarization substantially parallel to the x axis and TM-polarized light may have a polarization substantially parallel to the y axis.

As illustrated in FIG. 1A, the PDL compensator 100 may be configured to rotate about the y axis. A rotation angle of the PDL compensator 100 about the y axis may be referred to herein as compensator angle $\theta y$. A value of $\theta y$ may be in a range from 0 degrees to 90 degrees. In other embodiments, $\theta y$ may be less than 0 degrees and/or greater than 90 degrees.

Alternately or additionally, and as illustrated in FIG. 1B, the PDL compensator 100 may be configured to rotate about the x axis. A rotation angle of the PDL compensator 100 about the x axis may be referred to herein as compensator angle $\theta y$. A value of $\theta x$ may be in a range from 0 degrees to 90 degrees. In other embodiments, $\theta x$ may be less than 0 degrees and/or greater than 90 degrees.

The PDL compensator 100 may include PDL that depends on an incident angle of the optical signal 102 with respect to the PDL compensator 100. More particularly, the PDL of the PDL compensator 100 may depend on an incident angle of the optical signal 102 with respect to a normal 106 of the PDL compensator 100 as projected into the x-z plane; the foregoing incident angle is denoted $\theta i$-xz in FIG. 1A. In some embodiments, the incident angle $\theta i$-xz may be equal to the compensator angle $\theta_y$. Alternately or additionally, the PDL of the PDL compensator 100 may depend on an incident angle of the optical signal 102 with respect to the normal 106 as projected into the y-z plane; the foregoing incident angle is denoted $\theta_{i\text{-}yz}$ in FIG. 1B. In some embodiments, the incident angle $\theta_{i\text{-}yz}$ may be equal to the compensator angle $\theta_x$.

Accordingly, the PDL compensator 100 may be rotated in some embodiments about the x axis and/or y axis to impart a desired PDL to the optical signal 102. The desired PDL may be selected (e.g., by appropriate selection of the compensator angle(s) $\theta_y$ and/or $\theta_x$) to compensate for PDL in a propagation channel of the optical signal 102 and/or to otherwise generate a desired PDL in the optical signal 102. Compensating for PDL in a propagation channel may include imparting a PDL to the optical signal 102 that at least partially cancels out PDL imparted to the optical signal 102 by the propagation channel.

In some embodiments, the PDL compensator 100 may be mounted on or otherwise coupled to a rotation assembly (not shown) configured to rotate the PDL compensator 100 about the x axis and/or the y axis. The rotation assembly may include microelectromechanical system (MEMS) devices and/or structures, one or more gimbals, one or more flexure members, or other devices and/or structures suitable to rotate the PDL compensator 100 about the x axis and/or the y axis.

The optical signal 102 may be transmitted through a first propagation channel 104A positioned in an optical path of the optical signal 102 before the PDL compensator 100 and/or through a second propagation channel 104B positioned in the optical path of the optical signal 102 after the PDL compensator 100. The first and second propagation channels 104A and 104B may be referred to generically as a propagation channel 104 or propagation channels 104.

In some embodiments, the propagation channel 104 includes a medium (or series of media) that imparts PDL to the optical signal 102. The PDL compensator 100 may be configured to post-compensate and/or pre-compensate for PDL imparted by the propagation channel. For instance, the PDL compensator 100 may be configured to post-compensate for PDL imparted by the propagation channel 104A and/or to pre-compensate for PDL imparted by the propagation channel 104B.

Figure 2A:
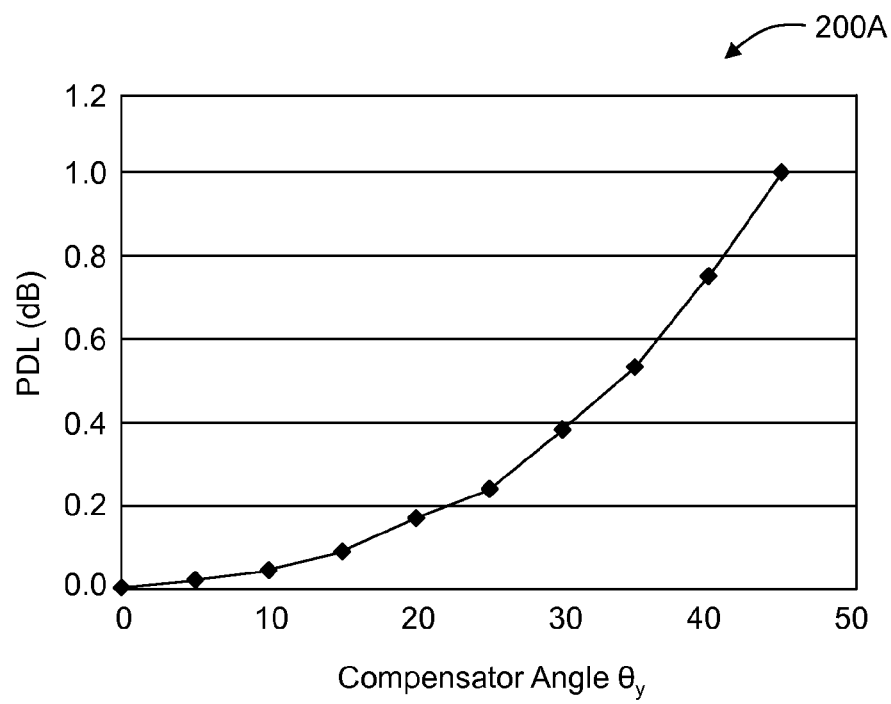
FIG. 2A is a graph that depicts PDL of an embodiment of the PDL compensator of FIGS. 1A and 1B as a function of a compensator angle about a first axis of rotation.
Figure 2B:
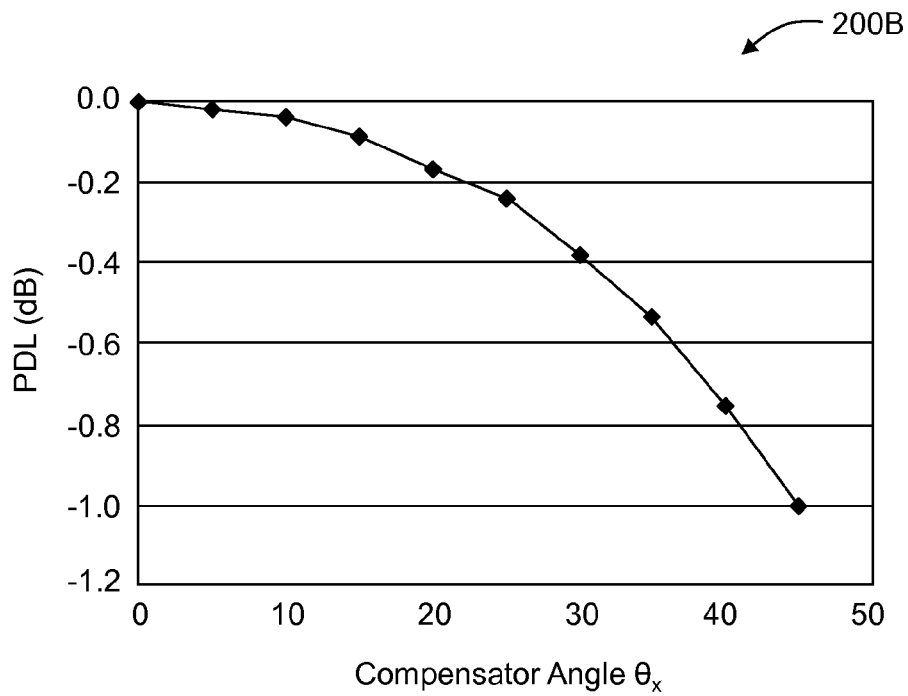
FIG. 2B is a graph that depicts PDL of the embodiment of the PDL compensator of FIGS. 1A and 1B as a function of a compensator angle about a second axis of rotation.

FIG. 2A is a graph 200A that depicts PDL of an embodiment of the PDL compensator 100 of FIGS. 1A and 1B as a function of compensator angle $\theta_y$ and FIG. 2B is a graph 200B that depicts PDL of the embodiment of the PDL compensator 100 of FIGS. 1A and 1B as a function of compensator angle $\theta x$, both arranged in accordance with at least one embodiment described herein.

In the graphs 200A and 200B of FIGS. 2A and 2B, the horizontal axis corresponds to compensator angle $\theta y$ (FIG. 2A) or $\theta x$ (FIG. 2B) of the PDL compensator 100 about the y axis or the x axis and the vertical axis corresponds to the PDL in decibels (dB) as a function of compensator angle $\theta y$ or $\theta x$ for a given wavelength of light. In the embodiment of FIGS. 2A and 2B, the PDL of the PDL compensator 100 increases with increasing compensator angle $\theta y$ about the y axis and decreases with increasing compensator angle $\theta x$ about the x axis.

The PDL of the PDL compensator 100 as a function of the compensator angles $\theta y$ and $\theta x$ may be the same, substantially the same, or different for different wavelengths of light within a wavelength range of the PDL compensator 100. When the PDL as a function of the compensator angles $\theta y$ and $\theta x$ is different for different wavelengths of light, e.g., when the PDL is wavelength-dependent, the PDL compensator 100 may be referred to as a wavelength-dependent PDL compensator.

Figure 3A:
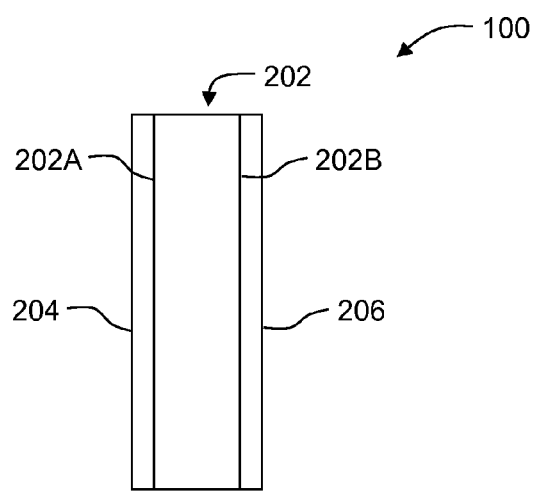
FIG. 3A is a side view of an example embodiment of the PDL compensator of FIGS. 1A and 1B.

FIG. 3A is a side view of an example embodiment of the PDL compensator 100 of FIGS. 1A and 1B, arranged in accordance with at least one embodiment described herein. The PDL compensator 100 of FIG. 3A includes a substrate 202, a PR coating 204 formed on an input surface 202A of the substrate 202, and an AR coating 206 formed on an output surface 202B of the substrate 202.

As previously discussed, the PDL compensator 100 may include a PDL that depends on an incident angle of light with respect to the PDL compensator 100. More particularly, the PDL of the PDL compensator 100 may depend on an incident angle of light with respect to the PR coating 204. For instance, the PDL of the PDL compensator 100 may depend on the incident angle θi-xz and/or the incident angle θi-yz, described above, with respect to the PR coating 204.

The substrate 202 may include silica, silicon, fused silica, glass, or other suitable substrate material.

Figure 3B:
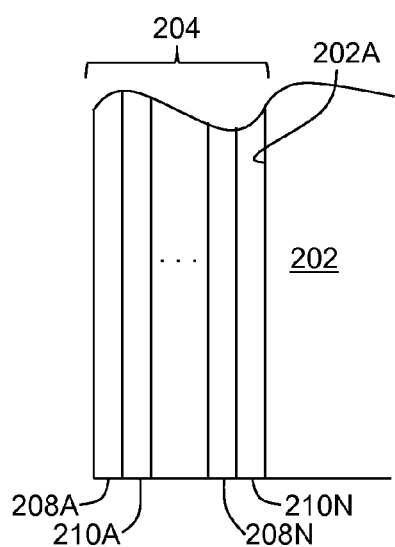
FIG. 3B is a detail side view of an example embodiment of a partial reflective (PR) coating that may be included in the embodiment of the PDL compensator of FIG. 3A.

FIG. 3B is a detail side view of an example embodiment of the PR coating 204 of FIG. 3A, arranged in accordance with at least one embodiment described herein. In general, the PR coating 204 may include material layers of alternating index of refraction. For instance, the PR coating 204 may include one or more layers 208A, . . . , 208N (hereinafter layer 208 or layers 208) of a first material with a first index of refraction that alternate with one or more layers 210A, . . . , 210N (hereinafter layer 210 or layers 210) of a second material with a second index of refraction that is different than the first index of refraction. The layers 208 may include as few as a single layer or two, three, four, or even more layers of the first material. Analogously, the layers 210 may include as few as a single layer or two, three, four, or even more layers of the second material. In an example embodiment, the layers 208 include one or more layers of Ta2O5 while the layers 210 include one or more layers of SiO2 that alternate with the one or more layers of Ta2O5, e.g., a first layer of Ta2O5 followed by a first layer of SiO2 followed by a second layer of Ta2O5 followed by a second layer of SiO2, etc.

Figure 3C:
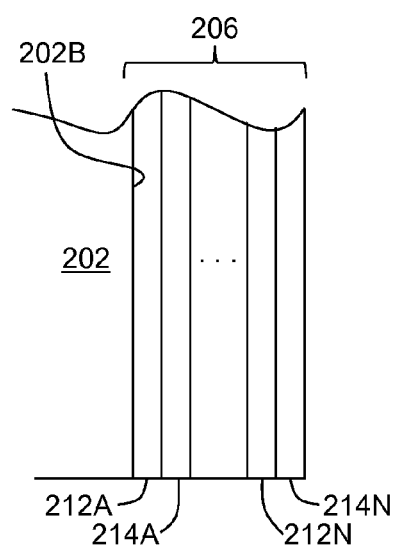
FIG. 3C is a detail side view of an example embodiment of an anti-reflective (AR) coating that may be included in the embodiment of the PDL compensator of FIG. 3A.

FIG. 3C is a detail side view of an example embodiment of the AR coating 206 of FIG. 3A, arranged in accordance with at least one embodiment described herein. In general, the AR coating 206 may include material layers of alternating index of refraction. For instance, the AR coating 206 may include one or more layers 212A, . . . , 212N (hereinafter layer 212 or layers 212) of a third material with a third index of refraction that alternate with one or more layers 214A, . . . , 214N (hereinafter layer 214 or layers 214) of a fourth material with a fourth index of refraction that is different than the third index of refraction. The layers 212 may include as few as a single layer or two, three, four, or even more layers of the third material. Analogously, the layers 214 may include as few as a single layer or two, three, four, or even more layers of the fourth material. In some embodiments, the third material is the same as the first material used in the PR coating 204 while the fourth material is the same as the second material used in the PR coating 204. For instance, in an example embodiment, the layers 212 include two layers of Ta2O5 while the layers 214 include two layers of SiO2 that alternate with the layers of Ta2O5.

Figure 4:
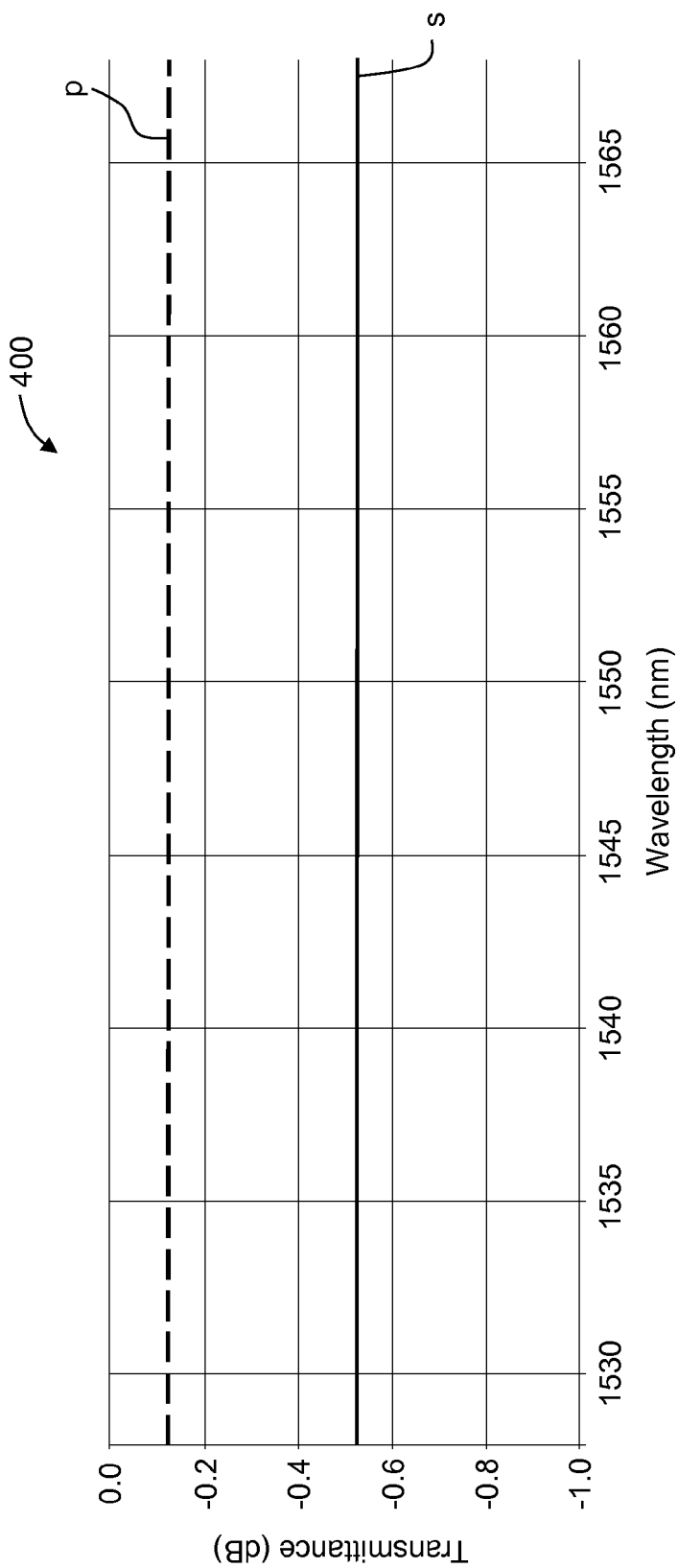
FIG. 4 is a graph that depicts transmittance of an example first PR coating.

Various specific layer compositions for each of the PR coating 204 and the AR coating 206 of the PDL compensator 100 will now be described with respect to FIGS. 4-7C. FIG. 4 is a graph 400 that depicts transmittance of an example first PR coating, arranged in accordance with at least one embodiment described herein. The first PR coating of FIG. 4 is an example embodiment of the PR coating 204 described above and is described in further detail in Table 1A.

TABLE 1A

First PR Coating

| | Layer | |
|---|---|---|
| | 1 | 2 |
| Material | Ta2O5 | SiO2 |
| QWOT (nm) | 0.1523 | 0.6920 |
| Thickness (nm) | 28.24 | 183.66 |

According to Table 1A, the first PR coating includes two layers 1 and 2. Layer 1 includes Ta2O5 and layer 2 includes SiO2. A quarter wave optical thickness (QWOT) of Layer 1 may be 0.1523 nanometers (nm). The QWOT may be defined as the wavelength at which n (index of refraction of the corresponding material layer) multiplied by d (e.g., the physical thickness of the corresponding material layer) is one quarter wavelength, or $n*d=\lambda/4$. A thickness (e.g., d) of layer 1 may be 28.24 nm. A QWOT and thickness of layer 2 may respectively be 0.6920 nm and 183.66 nm.

The graph 400 of FIG. 4 illustrates the transmittance of the first PR coating as a function of wavelength at a fixed compensation angle θx of 40 degrees for two orthogonal polarization components of an optical signal, including p-polarized light and s-polarized light. The transmittance spectrum for the p-polarized light is labeled "p" in FIG. 4 and the transmittance spectrum for the s-polarized light is labeled "s" in FIG. 4. A similar naming convention is applied in subsequent figures. As illustrated in FIG. 4, the transmittance of the first PR coating is substantially independent of wavelength, at least within a wavelength range 1528 nm to 1568 nm, insofar as the transmittance for both the p-polarized light and the s-polarized light is substantially constant for the wavelength range.

Table 1B includes various transmittance values of the first PR coating for p-polarized light and s-polarized light at two wavelengths for five different compensation angles θx. Table 1B additionally includes corresponding PDL values, calculated according to equation 1 above (e.g., $PDL=\Gamma_{TE}-\Gamma_{TM}$) and substituting $\Gamma_s$ for $\Gamma_{TE}$ and $\Gamma_p$ for $\Gamma_{TM}$ in the equation, where $\Gamma_s$ is transmittance of the s-polarized light and $\Gamma_p$ is transmittance of the p-polarized light. In other words, PDL in Table 1B and other tables herein is calculated according to equation 2:

$$PDL = \Gamma_s - \Gamma_p \quad \text{(eq. 2)}$$

Although not set forth explicitly herein, a table analogous to Table 1B for different compensation angles $\theta_y$ could similarly be generated.

TABLE 1B

| Compensator Angle $\theta_x$ | Wavelength (nm) | $\Gamma_s$ (dB) | $\Gamma_p$ (dB) | PDL (dB) |
|---|---|---|---|---|
| 34 degrees | 1528 | −0.4418 | −0.1688 | −0.2730 |
| | 1568 | −0.4431 | −0.1690 | −0.2741 |
| 37 degrees | 1528 | −0.4806 | −0.1481 | −0.3325 |
| | 1568 | −0.4816 | −0.1481 | −0.3335 |
| 40 degrees | 1528 | −0.5265 | −0.1261 | −0.4004 |
| | 1568 | −0.5271 | −0.1258 | −0.4013 |
| 43 degrees | 1528 | −0.5807 | −0.1029 | −0.4778 |
| | 1568 | −0.5809 | −0.1025 | −0.4784 |
| 46 degrees | 1528 | −0.6450 | −0.0793 | −0.5657 |
| | 1568 | −0.6447 | −0.0787 | −0.5660 |

It can be seen from Table 1B that the PDL values of the first PR coating decrease as a function of increasing compensator angle $\theta_x$, analogous to the relationship between compensator angle $\theta_x$ and PDL illustrated in the graph 200B of FIG. 2B. Although not set forth explicitly herein, a table analogous to Table 1B for the compensator angle θy can be generated for the second PR coating that may include PDL values as a function of the compensator angle θy where the PDL values increase as a function of the compensator angle θy, analogous to the relationship between the compensator angle θy and PDL illustrated in the graph 200A of 2A.

It can also be seen from Table 1B that the PDL of the first PR coating is substantially independent of wavelength. As used herein, PDL may be considered to be substantially independent of wavelength if, at a given compensator angle, a slope of the transmittance spectrum for each of the p-polarized light and the s-polarized light is in a range between −0.00125 dB/nm and 0.00125 dB/nm. For example, at 34 degrees, the slope of the transmittance spectrum for the p-polarized light is (−0.1690 dB−−0.1688 dB)/(1568 nm 1528 nm)=−5*10-6 dB/nm and the slope of the transmittance spectrum for the s-polarized light is (−0.4431 dB−−0.4418 dB)/(1568 nm 1528 nm)=−3.25*10-5 dB/nm, both of which are within the range between −0.00125 dB/nm and 0.00125 dB/nm.

Figure 5:
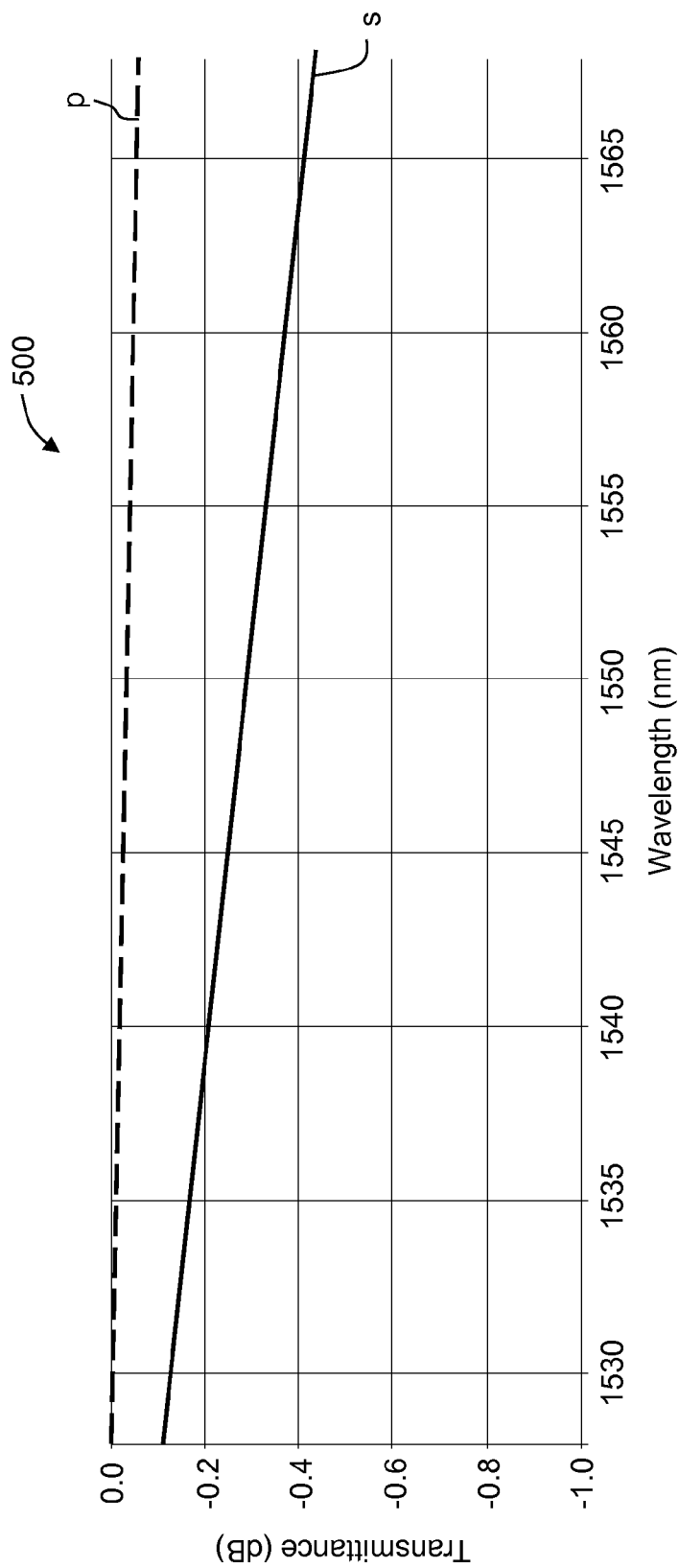
FIG. 5 is a graph that depicts transmittance of an example second PR coating.

FIG. 5 is a graph 500 that depicts transmittance of an example second PR coating, arranged in accordance with at least one embodiment described herein. The second PR coating of FIG. 5 is another example embodiment of the PR coating 204 described above and is described in further detail in Table 2A.

TABLE 2A

Second PR Coating

| | Layer | | | | | |
|---|---|---|---|---|---|---|
| | 1 | 2 | 3 | 4 | 5 | 6 |
| Material | Ta2O5 | SiO2 | Ta2O5 | SiO2 | Ta2O5 | SiO2 |
| QWOT (nm) | 1.3450 | 1.5269 | 1.4674 | 1.5272 | 1.3236 | 1.2590 |
| Thickness (nm) | 249.37 | 405.26 | 272.07 | 405.34 | 245.40 | 334.15 |

According to Table 2A, the second PR coating includes six layers 1-6, including layers of Ta2O5 alternating with layers of SiO2. More particularly, layers 1, 3, and 5 include Ta2O5 and layers 2, 4, and 6 include SiO2. The QWOT and thickness of each of layers 1-6 are provided in Table 2A.

Analogous to the graph 400 of FIG. 4, the graph 500 of FIG. 5 illustrates the transmittance of the second PR coating as a function of wavelength at a fixed compensation angle θx of 40 degrees for orthogonal p-polarized light and s-polarized light. As illustrated in FIG. 5, the transmittance of the second PR coating is wavelength-dependent in the illustrated wavelength range of 1528 nm to 1568 nm insofar as the transmittance for both the p-polarized light and the s-polarized light decreases with increasing wavelength.

Analogous to Table 1B, Table 2B below includes various transmittance values of the second PR coating for p-polarized light and s-polarized light at two wavelengths for 5 different compensation angles $\theta_x$. Table 2B additionally includes corresponding PDL values, calculated according to equations 1 and/or 2 above. Although not set forth explicitly herein, a table analogous to Table 2B for different compensation angles $\theta_y$ could similarly be generated.

TABLE 2B

| Compensator Angle $\theta_x$ | Wavelength (nm) | $\Gamma_s$ (dB) | $\Gamma_p$ (dB) | PDL (dB) |
|---|---|---|---|---|
| 34 degrees | 1528 | −0.0272 | −0.0268 | −0.0004 |
| | 1568 | −0.1075 | −0.0089 | −0.0986 |
| 37 degrees | 1528 | −0.0344 | −0.0071 | −0.0273 |
| | 1568 | −0.2306 | −0.0257 | −0.2049 |
| 40 degrees | 1528 | −0.1021 | −0.0003 | −0.1018 |
| | 1568 | −0.4166 | −0.0498 | −0.3668 |
| 43 degrees | 1528 | −0.2452 | −0.0036 | −0.2416 |
| | 1568 | −0.6654 | −0.0778 | −0.5876 |
| 46 degrees | 1528 | −0.4704 | −0.0133 | −0.4571 |
| | 1568 | −0.9687 | −0.1073 | −0.8614 |

It can be seen from Table 2B that the PDL values of the second PR coating decrease as a function of increasing compensator angle $\theta_x$, analogous to the relationship between compensator angle $\theta_x$ and PDL illustrated in the graph 200B of FIG. 2B. Although not set forth explicitly herein, a table analogous to Table 2B for the compensator angle θy can be generated for the second PR coating that may include PDL values as a function of the compensator angle θy where the PDL values increase as a function of the compensator angle θy, analogous to the relationship between the compensator angle θy and PDL illustrated in the graph 200A of 2A.

It can also be seen from Table 2B that the PDL of the second PR coating is wavelength-dependent. As used herein, PDL may be considered to be wavelength-dependent if, at a given compensator angle, a slope of the transmittance spectrum for each of the p-polarized light and the s-polarized light is less than or equal to −0.00125 dB/nm or greater than or equal to 0.00125 dB/nm. For example, at 34 degrees, the slope of the transmittance spectrum for the p-polarized light is (−0.0089 dB−−0.0268 dB)/(1568 nm 1528 nm)=−4.475*10-4 dB/nm and the slope of the transmittance spectrum for the s-polarized light is (−0.1075 dB−−0.0272 dB)/(1568 nm 1528 nm)=−0.002007 dB/nm. Since the slope of the transmittance spectrum for the s-polarized light is less than −0.00125 dB/nm, the PDL of the second PR coating may be considered to be wavelength-dependent.

Figure 6:
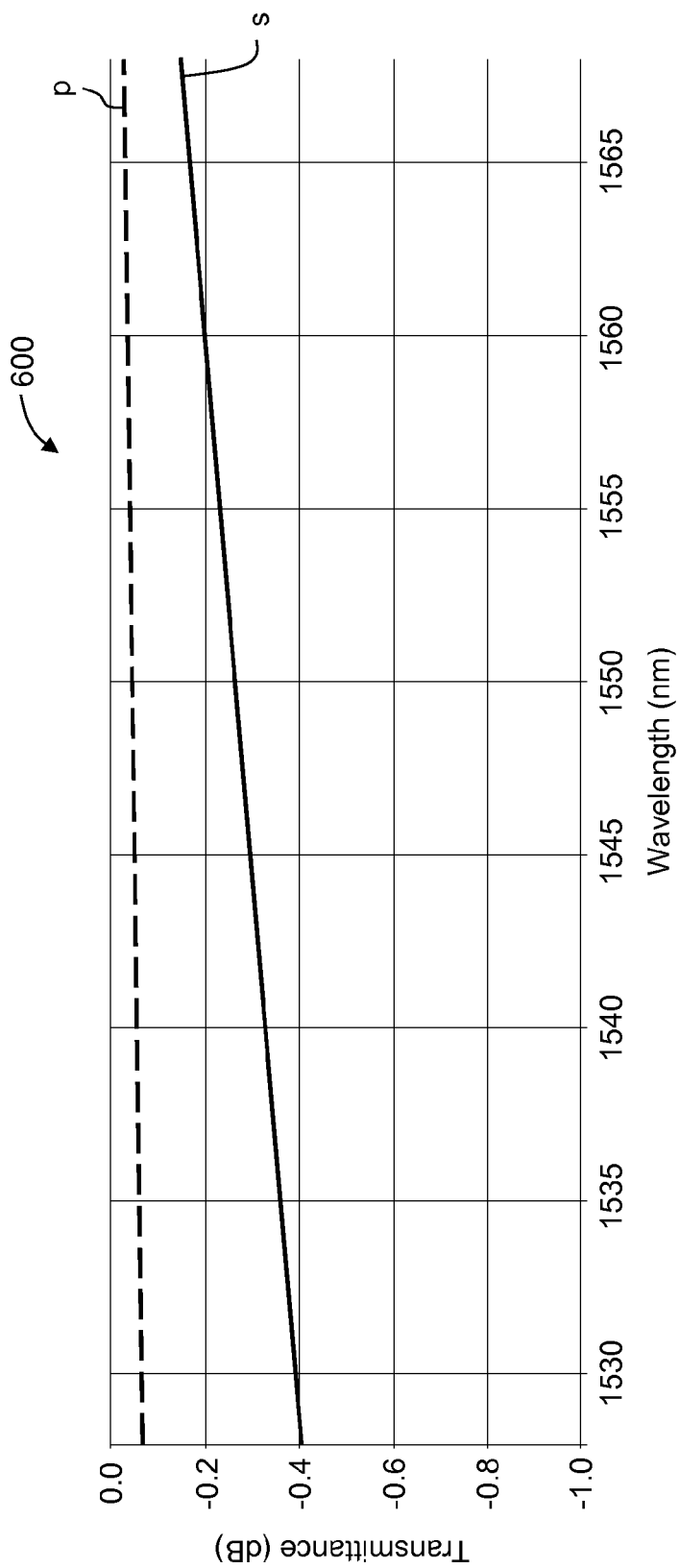
FIG. 6 is a graph that depicts transmittance of an example third PR coating.

FIG. 6 is a graph 600 that depicts transmittance of an example third PR coating, arranged in accordance with at least one embodiment described herein. The third PR coating of FIG. 6 is yet another example embodiment of the PR coating 204 described above and is described in further detail in Table 3A.

TABLE 3A

Third PR Coating

| | Layer | | | | | |
|---|---|---|---|---|---|---|
| | 1 | 2 | 3 | 4 | 5 | 6 |
| Material | Ta2O5 | SiO2 | Ta2O5 | SiO2 | Ta2O5 | SiO2 |
| QWOT (nm) | 1.0269 | 0.9348 | 0.5283 | 0.5837 | 0.9006 | 0.3284 |
| Thickness (nm) | 190.39 | 248.11 | 97.95 | 154.92 | 166.98 | 87.16 |

According to Table 3A, the third PR coating includes six layers 1-6, including layers of Ta2O5 alternating with layers of SiO2. More particularly, layers 1, 3, and 5 include Ta2O5 and layers 2, 4, and 6 include SiO2. The QWOT and thickness of each of layers 1-6 are provided in Table 3A.

Analogous to the graph 400 of FIG. 4, the graph 600 of FIG. 6 illustrates the transmittance of the third PR coating as a function of wavelength at a fixed compensation angle $\theta_x$ of 40 degrees for orthogonal p-polarized light and s-polarized light. As illustrated in FIG. 6, the transmittance of the third PR coating is wavelength-dependent in the illustrated wavelength range of 1528 nm to 1568 nm insofar as the transmittance for both the p-polarized light and the s-polarized light increases with increasing wavelength.

Analogous to Table 1B, Table 3B below includes various transmittance values of the third PR coating for p-polarized light and s-polarized light at two wavelengths for 5 different compensation angles $\theta_x$. Table 3B additionally includes corresponding PDL values, calculated according to equations 1 and/or 2 above. Although not set forth explicitly herein, a table analogous to Table 3B for different compensation angles $\theta_y$ could similarly be generated.

TABLE 3B

| Compensator Angle $\theta_x$ | Wavelength (nm) | $\Gamma_s$ (dB) | $\Gamma_p$ (dB) | PDL (dB) |
|---|---|---|---|---|
| 34 degrees | 1528 | −0.6102 | −0.2013 | −0.4089 |
| | 1568 | −0.2441 | −0.0572 | −0.1869 |
| 37 degrees | 1528 | −0.5037 | −0.1199 | −0.3838 |
| | 1568 | −0.1739 | −0.0217 | −0.1522 |
| 40 degrees | 1528 | −0.3983 | −0.0610 | −0.3373 |
| | 1568 | −0.1153 | −0.0048 | −0.1105 |
| 43 degrees | 1528 | −0.2997 | −0.0253 | −0.2744 |
| | 1568 | −0.0752 | −0.0048 | −0.0704 |
| 46 degrees | 1528 | −0.2149 | −0.0113 | −0.2036 |
| | 1568 | −0.0616 | −0.0189 | −0.0427 |

It can be seen from Table 3B that the PDL values of the third PR coating increase as a function of increasing compensator angle $\theta_x$. It can also be seen from Table 3B that the PDL of the third PR coating is wavelength-dependent. For example, at 34 degrees, the difference in PDL at 1528 nm and 1568 nm divided by either of the PDLs is at least 0.54 which is greater than 0.05.

Figure 7A:
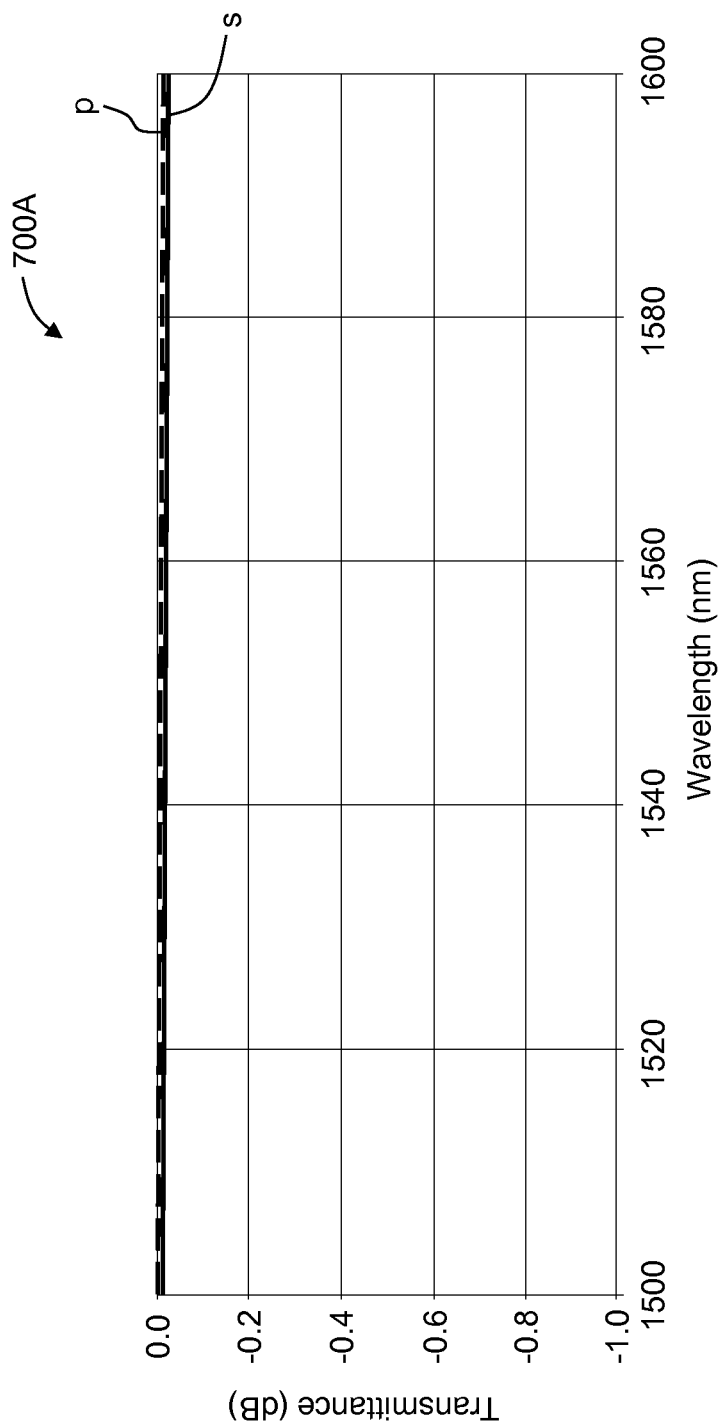
FIGS. 7A-7C include graphs that depict transmittance of an example AR coating.
Figure 7B:
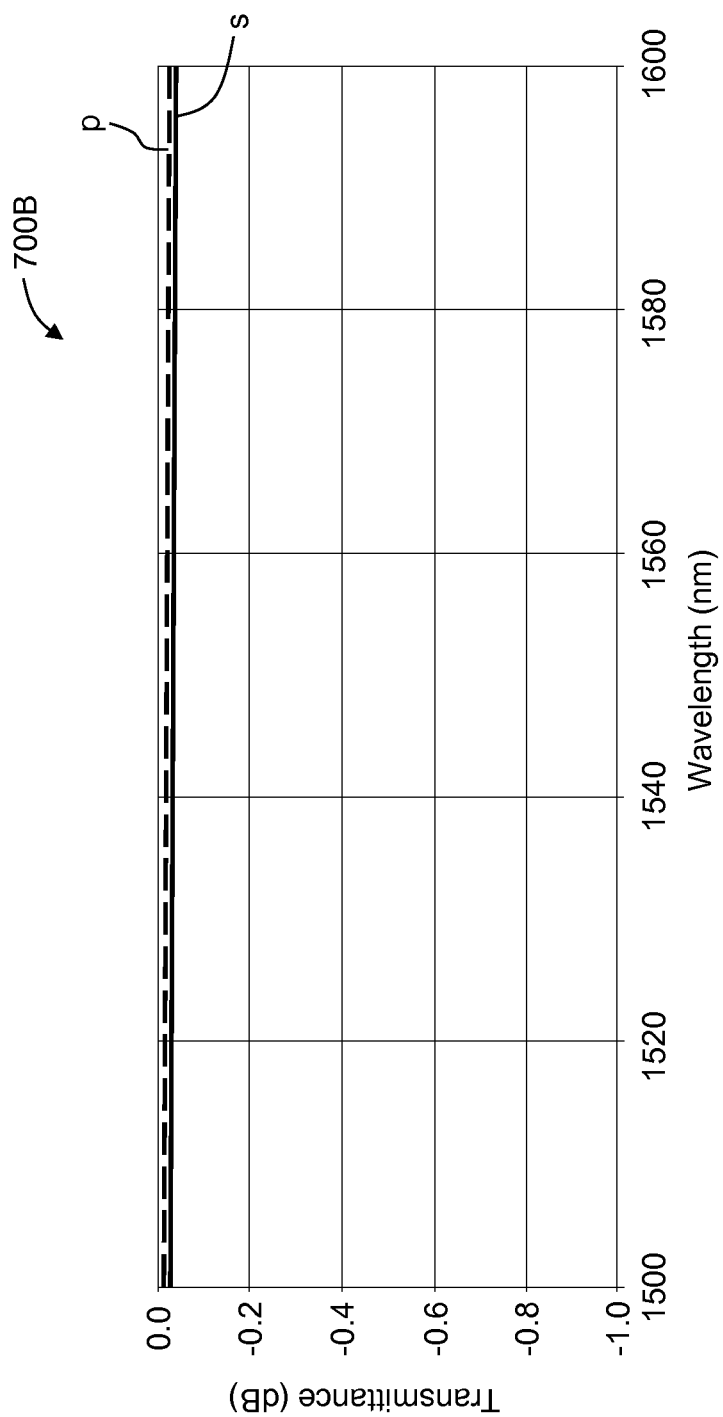
Figure 7C:
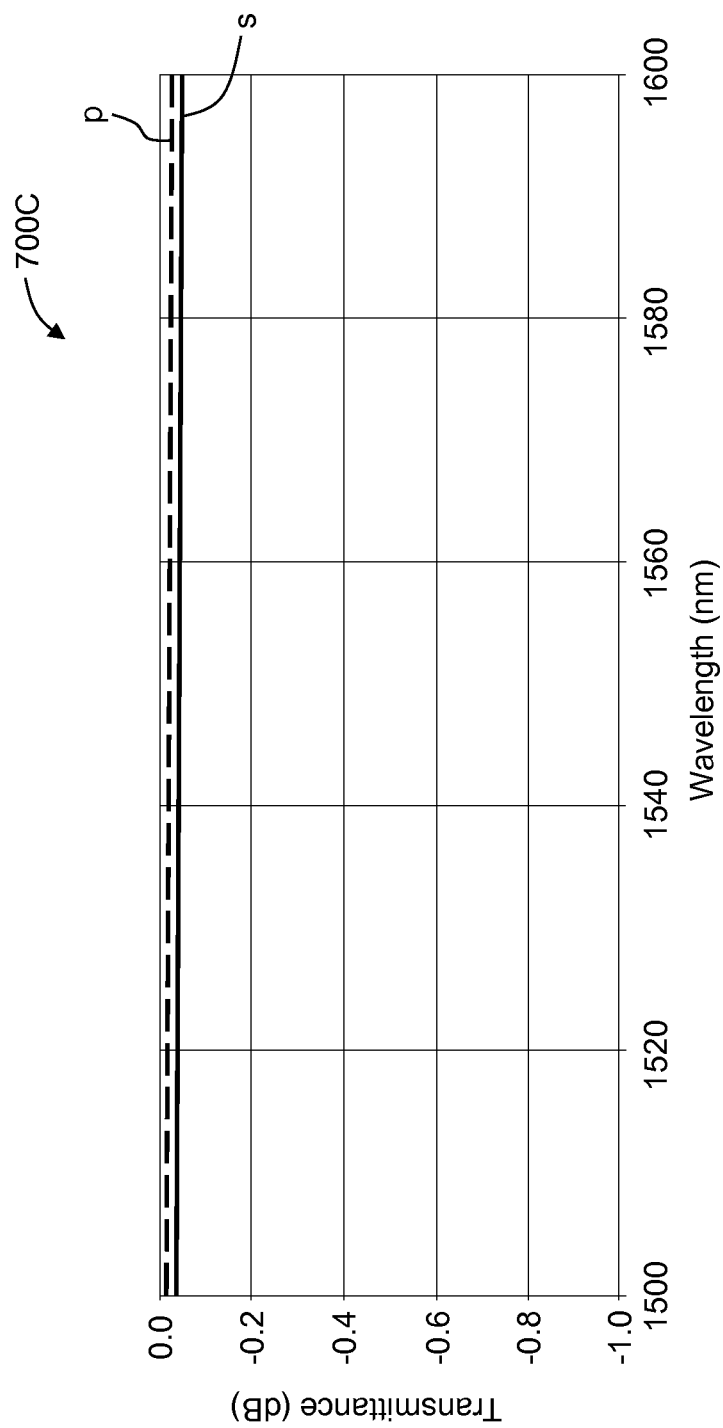

FIGS. 7A-7C include graphs 700A-700C that depict transmittance of an example AR coating, arranged in accordance with at least one embodiment described herein. The AR coating of FIGS. 7A-7C is an example embodiment of the AR coating 206 described above and is described in further detail in Table 4A.

TABLE 4A

AR Coating

| | Layer | | | |
|---|---|---|---|---|
| | 1 | 2 | 3 | 4 |
| Material | Ta2O5 | SiO2 | Ta2O5 | SiO2 |
| QWOT (nm) | 0.3208 | 0.3507 | 1.1100 | 1.0149 |
| Thickness (nm) | 59.48 | 93.08 | 205.80 | 269.37 |

According to Table 4A, the AR coating includes four layers 1-4, including layers of Ta2O5 alternating with layers of SiO2. More particularly, layers 1 and 3 include Ta2O5 and layers 2 and 4 include SiO2. The QWOT and thickness of each of layers 1-4 are provided in Table 4A.

The graph 700A of FIG. 7A illustrates the transmittance of the AR coating as a function of wavelength at a fixed compensation angle $\theta_x$ of 35 degrees for orthogonal p-polarized light and s-polarized light. The graph 700B of FIG. 7B illustrates the transmittance of the AR coating as a function of wavelength at a fixed compensation angle $\theta_x$ of 40 degrees for orthogonal p-polarized light and s-polarized light. The graph 700C of FIG. 7C illustrates the transmittance of the AR coating as a function of wavelength at a fixed compensation angle $\theta_x$ of 45 degrees for orthogonal p-polarized light and s-polarized light. As illustrated in FIGS. 7A-7C, the transmittance of the third AR coating is substantially wavelength-independent in the illustrated wavelength range of 1528 nm to 1568 nm insofar as the transmittance for both the p-polarized light and the s-polarized light at the various compensation angles $\theta_x$ is substantially constant within the illustrated wavelength range.

Table 4B below includes various transmittance values of the third PR coating for p-polarized light and s-polarized light at two wavelengths for 5 different compensation angles $\theta_x$. Table 3B additionally includes corresponding PDL values, calculated according to equations 1 and/or 2 above. Although not set forth explicitly herein, a table analogous to Table 3B for different compensation angles $\theta_y$ could similarly be generated.

TABLE 4B

| Compensator Angle $\theta_x$ | Wavelength (nm) | $\Gamma_s$ (dB) | $\Gamma_p$ (dB) | PDL (dB) |
|---|---|---|---|---|
| 35 degrees | 1500 | −0.0104 | −0.0048 | −0.0056 |
| | 1525 | −0.0113 | −0.0057 | −0.0056 |
| | 1550 | −0.0125 | −0.0070 | −0.0055 |
| | 1575 | −0.0139 | −0.0087 | −0.0052 |
| 40 degrees | 1500 | −0.0203 | −0.0102 | −0.0101 |
| | 1525 | −0.0215 | −0.0117 | −0.0098 |
| | 1550 | −0.0230 | −0.0135 | −0.0095 |
| | 1575 | −0.0251 | −0.0158 | −0.0093 |
| 45 degrees | 1500 | −0.0373 | −0.0204 | −0.0169 |
| | 1525 | −0.0388 | −0.0225 | −0.0163 |
| | 1550 | −0.0410 | −0.0250 | −0.0160 |
| | 1575 | −0.0441 | −0.0280 | −0.0161 |

It can be seen from Table 4B that the PDL values of the AR coating decrease as a function of increasing compensator angle $\theta_x$, analogous to the relationship between compensator angle $\theta_x$ and PDL illustrated in the graph 200B of FIG. 2B. Although not set forth explicitly herein, a table analogous to Table 4B for the compensator angle θy can be generated for the AR coating that may include PDL values as a function of the compensator angle θy where the PDL values increase as a function of the compensator angle θy, analogous to the relationship between the compensator angle θy and PDL illustrated in the graph 200A of 2A.

Figure 8:
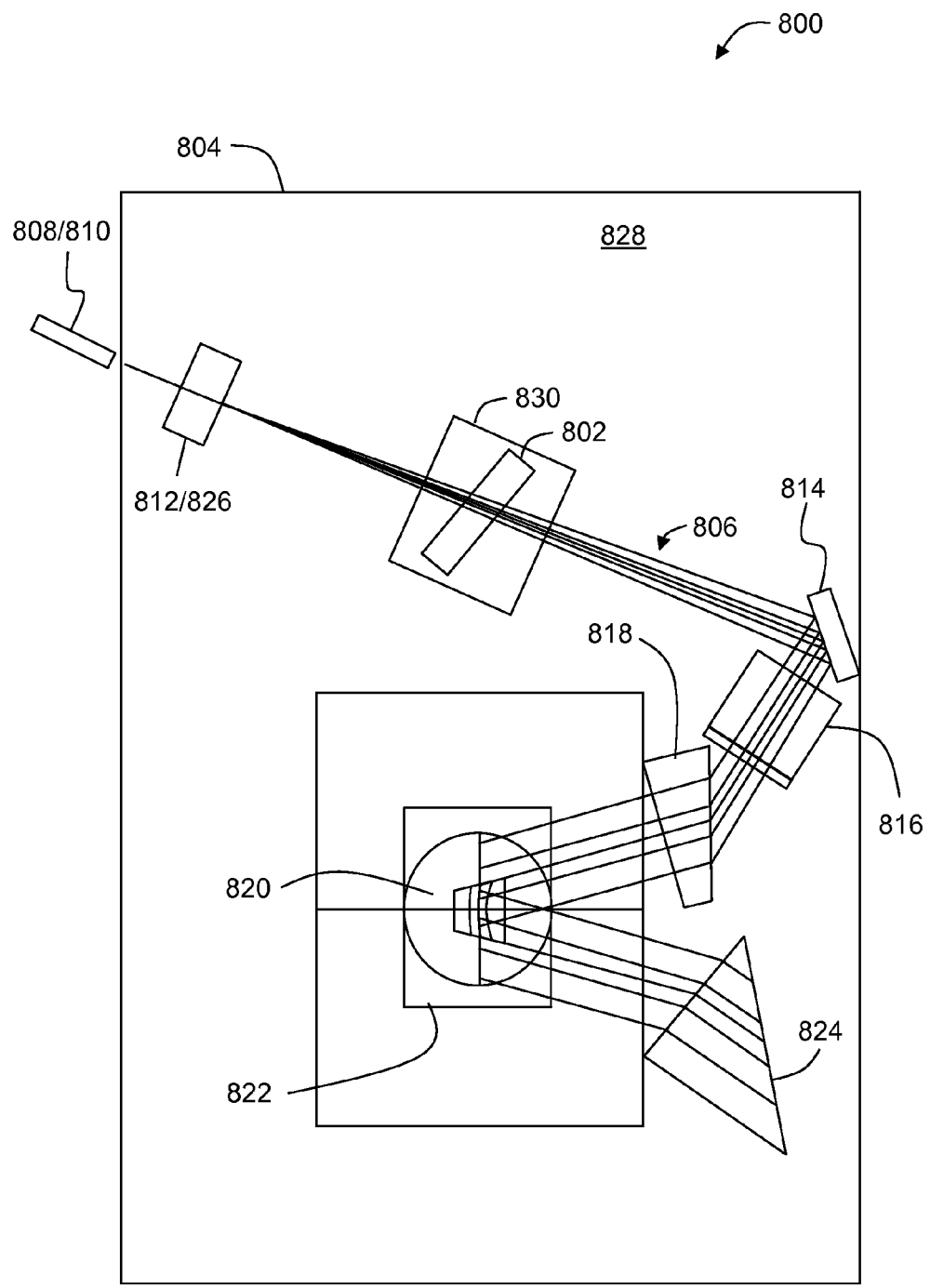
FIG. 8 illustrates an example operating environment in which a PDL compensator may be implemented, all arranged in accordance with at least some embodiments described herein.

FIG. 8 illustrates an example operating environment 800 in which a PDL compensator 802 may be implemented, arranged in accordance with at least one embodiment described herein. The PDL compensator 802 may include or correspond to the PDL compensator 100 described herein. For example, the PDL compensator 802 may include a substrate, a PR coating, and an AR coating, as described with respect to FIGS. 3A-3C. The PR coating and/or the AR coating may be configured as described elsewhere herein.

In the illustrated embodiment, the operating environment 800 includes an optical channel monitor (OCM) 804 in which the PDL compensator 802 is implemented to compensate PDL imparted by the OCM 804 to optical signals processed therein. FIG. 8 includes an overhead view of the OCM 804.

In more detail, the OCM 804 may receive one or more optical signals 806 from one or more input fibers 808 and may output processed versions of the optical signals 806 into one or more corresponding output fibers 810. The input fibers 808 and the output fibers 810 may be vertically stacked such that only one fiber (e.g., a top fiber) is visible in the overhead view of FIG. 8. The OCM 804 may support one, two, or three or more simultaneous beams and the number of the input fibers 808 and the output fibers 810 can be arranged to match the number of beams and can have any suitable arrangement to provide a selected channel output to a desired receiver.

The OCM 804 may include an input lens 812 (or an array of input lenses), the PDL compensator 802, a mirror 814, an imaging lens 816, an expanding prism 818, a MEMS mirror 820, a downwardly directed mirror 822, a grism 824, and an output lens 826 (or an array of output lenses). The OCM 804 may further include a substrate 828 on which the foregoing components of the OCM 804 may be mounted or otherwise coupled.

The input lens 812 and the output lens 826 may be vertically stacked such that only the input lens 812 (e.g., the lens on top of the stack) is visible in the overhead view of FIG. 8. The input lens 812 may reduce divergence of the optical signals 806 and increase a radial width of each beam incident onto the imaging lens 816. The output lens 826 may focus diffracted wavelength channels into the output fibers 810. The imaging lens 816 may be situated at a position such that its focal plane is located at the input lens 812 and/or the output lens 826.

In some embodiments, the optical signals 806 are first transmitted through the PDL compensator 802. Next the optical signals 806 are incident on the mirror 814 to confine the optical signals 806 to the region of the substrate 828. In embodiments utilizing different configurations of optical elements and/or in other embodiments, the mirror 814 may be omitted.

After deflection by the mirror 814, the optical signals 806 are incident on the imaging lens 816 which may collimate each optical signal 806 in a dispersion plane for later incidence on the grism 824. The imaging lens 816 may also collimate the optical signals 806 in a vertical port displacement plane and also reduce the spatial separation of each optical signal 806 in the port displacement plane such that maximum use is made of the available surface area of the MEMS mirror 820 and the grism 824. The confining performed in the port displacement plane may provide more efficient utilization of the MEMS mirror 820 and may allow more input and output ports to be implemented into the OCM 804.

Next the optical signals 806 traverse the expanding prism 818 which spreads the width of each optical signal 806 in the dispersion plane. When the optical signals 806 are circular in diameter, the expanding prism 818 may therefore stretch each of the op signals 806 into an elliptical shape with the long axis being horizontal. Increasing the width of the optical signals 806 may allow more surface area of the grism 824 to be utilized thereby producing a more efficient diffraction of light.

The optical signals 806 are then incident on the downwardly directed mirror 822, which directs the optical signals 806 onto the MEMS mirror 820. In some embodiments, the MEMS mirror 820 is circular in horizontal shape and is pivotally mounted to the substrate 828 for selectively steering the optical signals 806 vertically and/or horizontally onto the grism 824. However, in alternative embodiments, the MEMS mirror 820 may have different horizontal shapes including a square or rectangular shape. Following reflection off the MEMS mirror 820 the optical signals 806 are reflected back onto the downwardly directed mirror 822 which directs them onto the grism 824. The optical signals 806 are then diffracted in the horizontal direction and a particular wavelength channel or diffraction order is coupled back through the OCM 804 to the output fibers 810.

The MEMS mirror 820 may be driven by a periodic input function so that it directionally scans each optical signal 806 in the horizontal plane. At certain mirror positions a wavelength channel may be coupled back through the OCM 804 into a corresponding one of the output fibers 810. The MEMS mirror 820 may also be rotated in the orthogonal direction such that the optical signals 806 may be directed vertically. As such, the optical signals 806 from the given input fiber 808 may be coupled into a predetermined one of the output fibers 810.

In some embodiments, the OCM 804 is bidirectional and reversible such that the input fibers 808 and the output fibers 810 are each able to either input or output the optical signals 806. That is, the input fibers 808 may be used as output fibers and the output fibers 810 may be used as input fibers. Further, in some embodiments, the input and output fibers 808 and 810 may be disposed in an alternating odd-even arrangement. Such an arrangement may have advantages associated with reducing cross-talk between adjacent fibers. Alternately or additionally, the OCM 804 may provide selectivity in which particular input and output ports are in use at any one time. This flexibility allows adjacent ports to be in use at alternate times such that cross-talk is reduced.

In traversing the OCM 804, each of the optical signals 806 may experience optical phenomena that degrade the quality of the optical signals 806. One such phenomenon is PDL, already described above. PDL may be compensated for by the PDL compensator 802. Embodiments of the PDL compensator 802 described herein may be relatively cheap while permitting continuous PDL adjustments, as appropriate for a given application. Other PDL compensators may include walk-off crystals and/or quarter-wave plates that may be significantly more expensive than embodiments of the PDL compensator described herein.

In some embodiments, the OCM further includes a rotation assembly 830. The rotation assembly 830 may couple the PDL compensator 802 to the substrate. The rotation assembly 830 may include microelectromechanical system (MEMS) devices and/or structures, one or more gimbals, one or more flexure members, or other devices and/or structures suitable to rotate the PDL compensator 100 about one or more axes of rotation.

An example embodiment of an OCM that, except for the PDL compensator 802, is substantially similar to the OCM 804 of FIG. 8, is described in greater detail in U.S. patent application Ser. No. 13/460,883, filed May 1, 2012, which application is herein incorporated by reference.

Embodiments described herein may include methods of compensating PDL using the PDL compensator 100 and/or 802 described herein. Such a method may include receiving, at a PDL compensator, an input signal subject to PDL within a propagation channel in which a first of two polarization states of the input signal is attenuated more than a second of the two polarization states. The method may also include rotating the PDL compensator such that an incident angle of the input signal with respect to an input surface of the PDL compensator is effective to compensate the PDL of the input signal within the propagation channel. The method may also include compensating the PDL of the input signal.

Compensating the PDL of the input signal may include attenuating the second of the two polarization states of the input signal more than the first of the two polarization states. Alternately or additionally, attenuating the second of the two polarization states of the input signal more than the first of the two polarization states may include attenuating, by the PDL compensator, the second of the two polarization states of the input signal by an amount equal to an attenuation of the first of the two polarization states by the propagation channel less an attenuation of the first of the two polarization states by the PDL compensator.

In these and other embodiments, rotating the PDL compensator may include at least one of rotating the PDL compensator about a first axis of rotation that is orthogonal to a propagation direction of the input signal or rotating the PDL compensator about a second axis of rotation that is orthogonal to the propagation direction of the input signal and to the first axis of rotation. Alternately or additionally, compensating the PDL of the input signal may include transmitting the input signal through a PR coating that includes material layers of alternating index of refraction, a substrate, and an AR coating that includes material layers of alternating index of refraction.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A polarization-dependent loss (PDL) compensator, comprising:
a substrate having an input surface and an output surface opposite the input surface;
an anti-reflective coating formed on the output surface; and
a partial reflective coating formed on the input surface.

2. The PDL compensator of claim 1, wherein the PDL compensator includes a PDL that depends on an incident angle of an optical signal with respect to the partial reflective coating.

3. The PDL compensator of claim 1, wherein the partial reflective coating comprises material layers of alternating index of refraction.

4. The PDL compensator of claim 3, wherein the material layers of alternating index of refraction comprise at least one layer of tantalum oxide (Ta2O5) and at least one layer of silicon dioxide (SiO2).

5. The PDL compensator of claim 4, wherein the at least one layer of Ta2O5 comprises one layer of Ta2O5 having a quarter wave optical thickness (QWOT) of 0.1523 nanometers and a thickness of 28.24 nanometers, and wherein the at least one layer of SiO2 comprises one layer of SiO2 having a QWOT of 0.6920 nanometers and a thickness of 183.66 nanometers.

6. The PDL compensator of claim 1, wherein the PDL of the PDL compensator is wavelength-dependent.

7. The PDL compensator of claim 6, wherein the partial reflective coating comprises:
a first layer of tantalum oxide (TaO5) having a quarter wave optical thickness (QWOT) of 1.3450 nanometers and a thickness of 249.37 nanometers;
a second layer of silicon dioxide (SiO2) having a QWOT of 1.5269 nanometers and a thickness of 405.26 nanometers;
a third layer of TaO5 having a QWOT of 1.4674 nanometers and a thickness of 272.07 nanometers;
a fourth layer of SiO2 having a QWOT of 1.5272 nanometers and a thickness of 405.34 nanometers;
a fifth layer of TaO5 having a QWOT of 1.3236 nanometers and a thickness of 245.40 nanometers; and
a sixth layer of SiO2 having a QWOT of 1.2590 nanometers and a thickness of 334.15 nanometers.

8. The PDL compensator of claim 6, wherein the partial reflective coating comprises:
a first layer of tantalum oxide (TaO5) having a quarter wave optical thickness (QWOT) of 1.0269 nanometers and a thickness of 190.39 nanometers;
a second layer of silicon dioxide (SiO2) having a QWOT of 0.9348 nanometers and a thickness of 248.11 nanometers;
a third layer of TaO5 having a QWOT of 0.5283 nanometers and a thickness of 97.95 nanometers;
a fourth layer of SiO2 having a QWOT of 0.5837 nanometers and a thickness of 154.92 nanometers;
a fifth layer of TaO5 having a QWOT of 0.9006 nanometers and a thickness of 166.98 nanometers; and
a sixth layer of SiO2 having a QWOT of 0.3284 nanometers and a thickness of 87.16 nanometers.

9. The PDL compensator of claim 1, wherein the anti-reflective coating comprises:
a first layer of tantalum oxide (TaO5) having a quarter wave optical thickness (QWOT) of 0.3208 nanometers and a thickness of 59.48 nanometers;
a second layer of silicon dioxide (SiO2) having a QWOT of 0.3507 nanometers and a thickness of 93.08 nanometers;
a third layer of TaO5 having a QWOT of 1.1100 nanometers and a thickness of 205.80 nanometers; and
a fourth layer of SiO2 having a QWOT of 1.1049 nanometers and a thickness of 269.37 nanometers.

10. The PDL compensator of claim 1, wherein the substrate comprises fused silica.

11. A method to compensate polarization-dependent loss (PDL), the method comprising:
receiving, at a PDL compensator, an input signal subject to PDL within a propagation channel in which a first of two polarization states of the input signal is attenuated more than a second of the two polarization states, the PDL compensator including a substrate having an input surface and an output surface opposite the input surface, an anti-reflective coating formed on the output surface, and a partial reflective coating formed on the input surface;
rotating the PDL compensator such that an incident angle of the input signal with respect to the input surface of the PDL compensator is effective to compensate the PDL of the input signal within the propagation channel; and
compensating the PDL of the input signal.

12. The method of claim 11, wherein compensating the PDL of the input signal comprises attenuating the second of the two polarization states of the input signal more than the first of the two polarization states.

13. The method of claim 12, wherein attenuating the second of the two polarization states of the input signal more than the first of the two polarization states comprises attenuating, by the PDL compensator, the second of the two polarization states of the input signal by an amount equal to an attenuation of the first of the two polarization states by the propagation channel less an attenuation of the first of the two polarization states by the PDL compensator.

14. The method of claim 11, wherein rotating the PDL compensator comprises at least one of rotating the PDL compensator about a first axis of rotation that is orthogonal to a propagation direction of the input signal or rotating the PDL compensator about a second axis of rotation that is orthogonal to the propagation direction of the input signal and to the first axis of rotation.

15. The method of claim 11, wherein compensating the PDL of the input signal comprises transmitting the input signal through a partial reflective coating that includes material layers of alternating index of refraction, a substrate, and an anti-reflective coating that includes material layers of alternating index of refraction.

16. An optical channel monitor (OCM) comprising:
a propagation channel including a plurality of optical elements, wherein the propagation channel includes a polarization-dependent loss (PDL); and
a PDL compensator disposed in the propagation channel and configured to at least partially compensate the PDL of the propagation channel, wherein the PDL compensator comprises:
a substrate having an input surface and an output surface opposite the input surface;
an anti-reflective coating formed on the output surface; and
a partial reflective coating formed on the input surface.

17. The OCM of claim 16, wherein the plurality of optical elements include:
a mirror positioned to receive and reflect an optical signal from an input of the OCM;
an imaging lens positioned to receive the optical signal after reflection by the mirror;
an expanding prism positioned to receive the optical signal after transmission through the imaging lens;
a downwardly directed mirror positioned to receive the optical signal after transmission through the expanding prism and to reflect the optical signal a first time;
a microelectromechanical systems (MEMS) mirror positioned to receive the optical signal after reflection by the downwardly directed mirror the first time and to reflect the optical signal back to the downwardly directed mirror for reflection of the optical signal a second time; and
a grism positioned to receive the optical signal after reflection by the downwardly directed mirror the second time.

18. The OCM of claim 17, wherein the PDL compensator is disposed between the input of the OCM and the imaging lens.

19. The OCM of claim 17, further comprising:
a substrate on which the mirror, the imaging lens, the expanding prism, the downwardly directed mirror, the MEMS mirror, and the grism are mounted; and
a rotation assembly that couples the PDL compensator to the substrate, wherein the rotation assembly is configured to rotate the PDL compensator about one or more axes of rotation.

20. The OCM of claim 16, wherein:
the anti-reflective coating comprises N1 layers of tantalum oxide (Ta2O5) and N1 layers of silicon dioxide (SiO2) arranged in an alternating manner with the N1 layers of Ta2O5;
N1 is an integer greater than or equal to 1;
the partial reflective coating comprises N2 layers of Ta2O5 and N2 layers of SiO2 arranged in an alternating manner with the N2 layers of Ta2O5; and
N2 is an integer greater than or equal to 1.

* * * * *